UNITED STATES PATENT OFFICE.

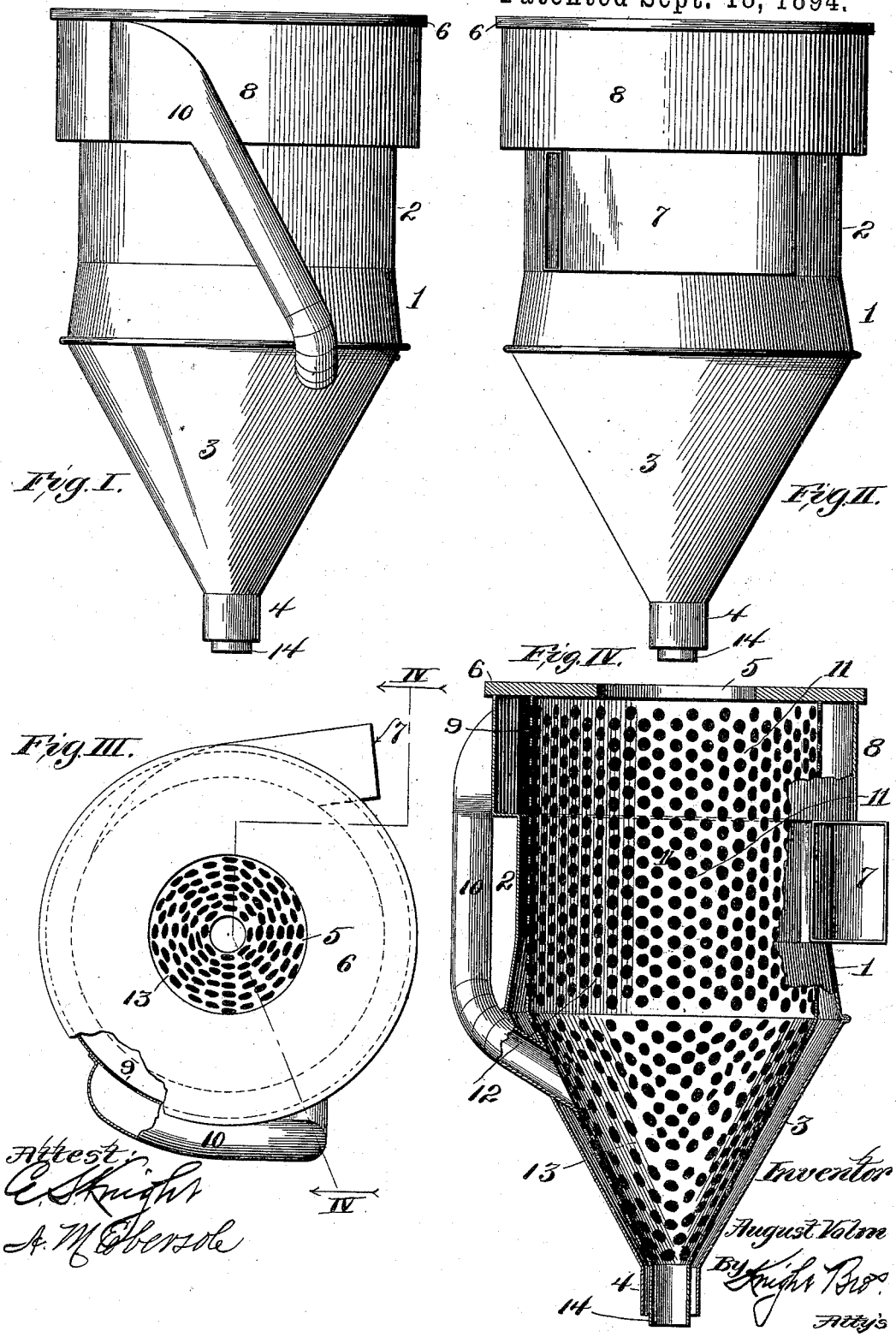

AUGUST VOLM, OF ST. LOUIS, MISSOURI.

DUST-ARRESTER.

SPECIFICATION forming part of Letters Patent No. 526,334, dated September 18, 1894.

Application filed May 28, 1894. Serial No. 512,607. (No model.)

*To all whom it may concern:*

Be it known that I, AUGUST VOLM, of the city of St. Louis, in the State of Missouri, have invented a certain new and useful Improvement in Dust-Arresters, of which the following is a full, clear, and exact description, reference being had to the accompanying drawings, forming part of this specification.

My invention relates to that class of dust arresters employed for separating dust from other materials, in which the combined products are conveyed into a chamber and there caused to be separated by a revolving circulating current of air, and my invention has particular reference to means for separating dust and saw-dust from shavings.

My invention consists in features of novelty hereinafter fully described and pointed out in the claims.

Figure I is a side elevation of my improved dust arrester showing the outer dust conveying pipe. Fig. II is a side elevation showing the inlet opening. Fig. III is a top view or plan. Fig. IV is a vertical section taken on line IV—IV, Fig. III.

Referring to the drawings, 1 represents the outer casing, the upper central portion 2 of which is cylindrical in form and the lower portion 3 of which is tapering to the outlet 4 where a pipe may be connected to carry off the dust and sawdust to be burned or otherwise disposed of.

5 represents an air exit opening in the top 6 of the casing and 7 is the tangentially arranged inlet by which the material to be operated on enters the perforated chamber in the arrester. This inlet being placed tangentially in the chamber 11, the current of air entering through it is thrown out against the interior surface of the chamber thus forcing the fine material, dust and saw-dust through the perforations into the outer casing.

Above the cylindrical portion 2 is an enlarged cylindrical portion 8, in one side of which is a dust exit opening 9 provided with a dust pipe 10 that passes down to the lower end of the casing where it is again connected to the perforated chamber. Within the outer casing is a perforated chamber 11, composed of an upper cylindrical portion 12 and a lower conical portion 13 ending in an outlet 14 to which a conveyer pipe may be secured.

The portion 8 of the casing is enlarged to afford an increased circulating space in that part of the arrester in order that any shavings that pass through the perforations into the chamber 11 will be drawn to this point and pass out through the pipe 10 and down through said pipe to the interior of the perforated chamber 11, where they are again acted upon by the current of air introduced into said chamber and thus many fine shavings, that would otherwise pass off with the dust are saved to pass out of the arrester with the clean shavings.

The shavings and sawdust in their mixed condition combined with dust are introduced into the perforated chamber 11 through the inlet 7 under pressure of a current of air and are caused to move rapidly round and round in the interior of the chamber 11 whereby the dust and sawdust are caused to pass through the perforations and down and out at the outlet 4 of the casing 1, while the clean shavings pass out at the lower end of the perforated chamber and are carried off in a separate pipe from that in which the dust and sawdust are conveyed.

I claim as my invention—

1. In a dust arrester, the combination of an outer imperforate casing, an inner perforated chamber and a dust pipe leading from the exterior of said casing to the interior of said perforated chamber: substantially as and for the purpose set forth.

2. In a dust arrester, the combination of an outer imperforate casing, having an enlarged upper portion, an inner perforated chamber, a dust pipe leading from said enlarged portion to said perforated chamber and an air inlet connected to said perforated chamber: substantially as set forth.

3. In a dust arrester, the combination of an outer imperforate casing, an inner perforated chamber and separate outlets connected to said casing and chamber one of said outlets being located within the other: substantially as described.

4. In a dust arrester, the combination of an outer imperforate casing, an inner perforated chamber, a tangentially arranged inlet connected to said perforated chamber, and a dust pipe connected to said casing and to said perforated chamber: substantially as described.

AUGUST VOLM.

In presence of—
E. S. KNIGHT,
A. M. EBERSOLE.